United States Patent Office 3,297,714
Patented Jan. 10, 1967

3,297,714
IMIDES OF 1,2,3,4 - CYCLOPENTANETETRACAR-
BOXYLIC ACID AND THE MONOANHYDRIDE
THEREOF
Ross Van Volkenburgh, Baton Rouge, La., assignor to
Copolymer Rubber & Chemical Corporation, a corporation of Louisiana
No Drawing. Filed Dec. 16, 1963, Ser. No. 330,571
17 Claims. (Cl. 260—326.3)

This invention relates to imide derivatives of cyclopentanetetracarboxylic acid and to a method for their preparation. In some of its more specific aspects, the invention relates to the unsubstituted imides and the alkyl, aryl, halo, and metal substituted imides of 1,2,3,4-cyclopentanetetracarboxylic acid and the monoanhydride thereof, and the preparation thereof.

1,2,3,4-cyclopentanetetracarboxylic acid and its mono and dianhydride derivatives have been prepared heretofore. However, the imide derivatives thereof have not been prepared and were unknown prior to the present invention.

It is an object of the present invention to provide novel imide derivatives of 1,2,3,4-cyclopentanetetracarboxylic acid and a method for their preparation.

It is a further object to provide novel imide derivatives of the cis, cis, cis, cis-stereoisomer of 1,2,3,4-cyclopentanetetraboxylic acid and a method for their preparation.

Still other objects and advantages of the invention will be apparent to those skilled in the art upon reference to the following detailed description and the examples.

In accordance with one important variant of the present invention, a variety of novel imide derivatives of 1,2,3,4-cyclopentanetetracarboxylic acid are provided. The imide derivatives may be monoimides of 1,2,3,4-cyclopentanetetracarboxylic acid or the monoanhydride thereof, or diimides of 1,2,3,4-cyclopentanetetracarboxylic acid. Specific examples of imide derivatives include the unsubstituted monoimide of 1,2,3,4-cyclopentanetetracarboxylic acid, the unsubstituted monoimide of the monoanhydride of 1,2,3,4-cyclopentanetetracarboxylic acid, the N-alkyl, N-haloalkyl, N-cycloalkyl, N-monocarbocyclic aryl, N-halo and N-metal monoimides of 1,2,3,4-cyclopentanetetracarboxylic acid, the N-alkyl, N-haloalkyl, N-cycloalkyl, N-monocarbocyclic aryl, N-halo and N-metal monoimides of the monoanhydride of 1,2,3,4-cyclopentanetetracarboxylic acid, the unsubstituted diimide of 1,2,3,4-cyclopentanetetracarboxylic acid and the N,N'-dialkyl, N,N'-dihaloalkyl, N,N'-dicycloalkyl, N,N'-dimonocarbocyclic aryl, N,N'-dihalo and N,N'-dimetal diimides of 1,2,3,4-cyclopentanetetracarboxylic acid. If desired, the N-alkyl, N'-monocarbocyclic aryl diimides of 1,2,3,4-cyclopentanetetracarboxylic acid may be prepared.

The alkyl, haloalkyl and cycloalkyl groups of the above-mentioned imides may have, for example, 1–20 carbon atoms and preferably 1–8 carbon atoms, and the monocarbocyclic aryl groups may have 6–20 carbon atoms and preferably 6–10 carbon atoms. Specific examples of alkyl groups include methyl, ethyl, propyl, isopropyl, butyl, isobutyl, amyl, isoamyl, hexyl, isohexyl, heptyl, octyl, isooctyl, nonyl and isononyl radicals. Specific examples of cycloalkyl groups include cyclopentyl and cyclohexyl groups. Specific examples of monocarbocyclic aryl groups include those containing a single benzene nucleus such as toluene, propyl benzene, isopropyl benzene, butyl benzene, tertiarybutyl benzene, etc.

The hydrogen atoms attached to the nitrogen atoms of unsubstituted monoimide and diimide derivatives may be replaced by halogen or metals to thereby provide N-halo or N,N'-dihalo and N-metal or N,N'-dimetal imide derivatives. Chlorine and mromine are preferred halogens and especially bromine which often provides derivatives having unusual properties. The alkali metals are preferred when preparing N-metal derivatives and especially sodium or potassium.

The various steroisomers of 1,2,3,4-cyclopentanetetracarboxylic acid and its mono and dianhydride derivatives may be employed in practicing the present invention. However, it is often preferred to use the cis,cis,cis,cis-stereoisomer. Cis,cis,cis,cis-1,2,3,4-cyclopentanetetracarboxylic acid is readily available by nitric acid oxidation of the Diels-Alder adduct of cyclopentadiene and maleic anhydride and the mono and dianhydride derivatives may be prepared therefrom by procedures well known in the art including refluxing with acetic anhydride. The various cyclopentanetetracarboxylic acids and their mono and dianhydride derivatives are well known and readily available following still other prior art practices.

The above-mentioned novel imides may be prepared by a number of methods known to produce imide derivatives of polycarboxylic acids. Usually, it is preferred that the mono or dianhydride or 1,2,3,4-cyclopentanetetracarboxylic acid be reacted with a nitrogen-containing compound such as urea, ammonia, hydrazine, or primary alkyl or aryl amines at elevated temperature. In instances where the temperature of the reaction is sufficiently elevated, the imide derivatives may be produced directly. In instances where lower temperatures are used an intermediate may be produced, which may be the monoamide-triacid derivative or the diamide-diacid derivative, depending upon whether the mono or dianhydride is employed, and the intermediate may be reacted at a higher elevated temperature to thereby produce the mono or diimide derivative. Alternate procedures include preparing the mono or diester derivative by reaction of the mono or dianhydride of 1,2,3,4-cyclopentanetetracarboxylic acid with excess alcohol, followed by addition of the nitrogen bearing compound to produce the corresponding ester-ammonium salt, and then heating the resultant ester-ammonium salt to an elevated temperature to form the mono or diimide.

Examples of primary amines include those containing the aforementioned alkyl and aryl groups and satisfactory alcohols for forming the ester include methyl, ethyl, propyl, isopropyl, butyl, isobutyl, amyl, etc. alcohols. In instances where a monoimide of 1,2,3,4-cyclopentanetetracarboxylic acid is to be prepared, then the monoanhydride derivative of the acid may be employed, or only sufficient of the nitrogen bearing compound used to react one mol thereof with each mol of the dianhydride. In instances where a monoimide of the monoanhydride of 1,2,3,4-cyclopentanetetracarboxylic acid is to be prepared, then only sufficient of the nitrogen bearing compound may be used to react with one of the anhydride groups of the dianhydride, or other procedures may be followed to assure that an anhydride group is present in the resultant monoimide molecule whether produced by dehydration of the diacid or by retaining an anhydride group initially present in the dianhydride reactant.

The halogen derivatives of the monoimides and diimides of 1,2,3,4-cyclopentanetetracarboxylic acid may be prepared by reacting the unsubstituted monoimide or diimide with halogen in an alkaline solution. For instance, the unsubstituted monoimide or diimide may be added to an alkali metal hydroxide solution, followed by addition of free bromine or chlorine to thereby produce the bromo or chloro derivative, respectively. In most instances, it is preferred that the reaction mixture be maintained at a low temperature such as 0° C. or below and that the reaction time be as short as possible. For example, the free halogen may be added to an aqueous mixture containing potassium or sodium hydroxide and the monoimide or diimide with agitation, and the resulting precipitate of the chloro or bromo derivative filtered immediately from the reaction mixture and dried.

The metal derivatives of the unsubstituted monoimide or diimide derivatives of 1,2,3,4 - cyclopentanetetracarboxylic acid may be prepared by reacting the monoimide or diimide with an alcoholic solution of a desired metal compound such as potassium or sodium hydroxide. If desired, the excess solvent may be removed by evaporation to leave behind a residue of the metal salt or dimetal salt, as the case may be. Other methods of preparing metal salts of imides may be used, if desired.

The monoimides and diimides of the present invention may be used as insecticidal compounds or in the preparation of other organic derivatives having similar or entirely different uses. When used as insecticides, they may be dissolved in a suitable organic solvent and the solution applied, or they may be applied in the dry state, in a manner so as to assure intimate contact with the insects to be controlled such as mosquitos and the like. The halogen derivatives of the monoimides and diimides mentioned herein are useful as halogenating agents for organic compounds, and also may be useful for the specific oxidation of secondary alcoholic groups. When so employed, the halogen derivatives may be brought into intimate contact with the organic compound to be halogenated or the secondary alcohol to be oxodized, preferably in solution, to thereby produce a halogen containing compound or odxidized derivative of the secondary alcohol, as the case may be. The metal derivatives of the monoimides or diimides are useful in preparing still other monoimide or diimide derivatives by reaction with alkyl halides or other reactive organic halides. Also, they are useful in the Gabriel synthesis of primary amines.

The novel compounds described and claimed herein have many unusual and unexpected properties which render them useful for numerous purposes. Thus, while they are especially advantageous for the above mentioned purposes, still other uses will be apparent to those skilled in the art.

The foregoing detailed description and the following specific examples are for purposes of illustration only and are not intended as being limiting to the spirit or scope of the appended claims.

*Example I*

This example illustrates the preparation of the unsubstituted diimide of 1,2,3,4-cyclopentanetetracarboxylic.

To a 250 milliliter three necked flask was added 35.7 grams (0.17 mol) of the dianhydride of cis,cis,cis,cis-1,2,3,4 - cyclopentanetetracarboxylic acid and 44.4 cc. of 28% aqueous ammonium hydroxide (0.66 mol $NH_3$). The temperature rose rapidly to 100° C. and the flask was fitted with a thermometer and an air condenser.

The mixture was heated for two hours until the melt temperature was 300° C., and then the hot melt was poured into a beaker containing 100 cc. of water. The resulting reaction product was cooled, filtered and dried under vacuum to thereby obtain 27.7 grams of the unsubstituted diimide of cis,cis,cis,cis-1,2,3,4-cyclopentanetetracarboxylic acid having a melting point of 300–301° C.

Evaporation of the aqueous filtrate gave 5.8 grams of impure product for a total yield of 95% of theory. The impure product was recrystallized twice from hot water to give an additional 3.8 grams of the purified diimide of cis,cis,cis,cis - 1,2,3,4 - cyclopentanetetracarboxylic acid which melted at 301° C.

*Example II*

This example illustrates the preparation of alkali metal salts of the unsubstituted diimide of cis,cis,cis,cis-1,2,3,4-cyclopentanetetracarboxylic acid.

The unsubstituted diimide of 1,2,3,4-cyclopentanetetracarboxylic acid prepared in accordance with Example I was reacted in an an amount of 10.4 grams with 6.4 grams of 87% potassium hydroxide in methanol. The solvent was removed by evaporation and the resulting residue of the N,N'-dipotassium diimide of cis,cis,cis,cis-1,2,3,4-cyclopentanetetracarboxylic acid was dried under vacuum at 60° C.

The N,N'-disodium diimide of 1,2,3,4-cyclopentanetetracarboxylic acid is prepared following the above procedure by substituting sodium hydroxide in methanol for the potassium hydroxide in methanol. The same number of chemical equivalents of sodium hydroxide as potassium hydroxide are used. The N,N'-dipotassium or disodium diimide of 1,2,3,4-cyclopentanetetracarboxylic acid is reacted with alkyl halides such as alkyl bromides to produce N-alkyl derivatives. For instance, normal butylbromide is reacted with the N,N'-dipotassium or disodium diimide of 1,2,3,4-cyclopentanetetracarboxylic acid to produce the N,N'-dibutyldiimide of cyclopentanetetracarboxylic acid.

*Example III*

This example illustrates the preparation of the dibutyldiamide-diacid derivative of cyclopentanetetracarboxylic acid and its use to produce the N,N'-dibutyldiimide of cyclopentanetetracarboxylic acid.

A mixture of 21 grams (0.1 mol) of the dianhydride of cis,cis,cis,cis-1,2,3,4-cyclopentanetetracarboxylic acid in 100 milliliters of acetronitrile was heated until a solution was obtained and then 16.6 grams (0.2 mol) of butylamine was added dropwise. A white precipitate formed and the resulting mixture was heated at reflux for 1 hour, cooled, filtered and dried to produce 29.4 grams of impure product having a melting point of 202–235° C. The impure material was recrystallized from methanol to obtain the dibutyldiamide-diacid derivative of cis,cis,cis,cis-1,2,3,4-cyclopentanetetracarboxylic acid melting at 243–245° C. which had the following analysis:

Calculated for $C_{17}H_{28}N_2O_6$: 57.30% carbon, 7.86% hydrogen, 7.86% nitrogen and 26.9% oxygen. Found: 57.63% carbon, 7.91% hydrogen, 7.78% nitrogen and 26.68% oxygen.

The above procedure was repeated using dimethylformamide or methanol as a reaction solvent. Each of these solvents also gave the dibutylamide-diacid derivative of 1,2,3,4-cyclopentanetetracarboxylic acid.

The N,N'-dibutyldiimide derivative of cis,cis,cis,cis-1,2,3,4-cyclopentanetetracarboxylic acid is obtained from the above prepared dibutyldiamide-diacid derivative by heating at an elevated temperature under subatmospheric pressure until converted to the diimide derivative.

*Example IV*

This example illustrates the preparation of the N,N'-diphenyldiimide derivative of cyclopentanetetracarboxylic acid.

The dianhydride of cis,cis,cis,cis-1,2,3,4-cyclopentanetetracarboxylic acid in an amount of 21.0 grams (0.1 mol) was refluxed with 50 milliliters of methanol to obtain a solution of the dimethyl ester. The resulting solution was cooled and a stoichiometric excess of freshly distilled aniline in an amount of 39.0 grams was added. The excess aniline and methanol was evaporated under vacuum to obtain the diester-dianiline salt derivative of cis,cis,cis,cis-1,2,3,4-cyclopentanetetracarboxylic acid.

The diester-dianiline salt prepared above was heated for 2½ hours to a melt temperature of 330° C. and the hot melt slowly poured into water with stirring. The crude product was crystallized twice from dimethylformamide to obtain 3.1 grams of product melting at 358–359° C. (uncorrected). The resulting N,N'-diphenyldiimide of cis,cis,cis,cis-1,2,3,4-cyclopentanetetracarboxylic acid was analyzed and the following data obtained:

Calculated for $C_{21}H_{16}N_2O_4$: 70.00% carbon, 4.45% hydrogen, 7.76% nitrogen and 17.80% oxygen. Found:

69.68% carbon, 4.47% hydrogen, 8.04% nitrogen and 17.81% oxygen.

Example V

This example illustrates another procedure for the preparation of the N,N'-diphenyldiimide derivative of 1,2,3,4-cyclopentanetetracarboxylic acid.

The dianhydride of 1,2,3,4-cyclopentanetetracarboxylic acid in an amount of 42 grams (0.2 mol) was heated with 40 grams (0.43 mol) of aniline to a temperature of 300° C. over a 2 hour period. The resulting hot melt was poured into 100 milliliters of water and the lumps thus produced were ground in a ball mill. The recovered yield of crude product was 66.8 grams and a 5 gram sample was recrystallized from 29 milliliters of dimethylformamide to produce a purified sample of the N,N'-diphenyldiimide derivative of 1,2,3,4-cyclopentanetetracarboxylic acid melting at 354–356° C.

Example VI

This example illustrates the preparation of the N,N'-dibromodiimide derivative of 1,2,3,4-cyclopentanetetracarboxylic acid.

The unsubstituted diimide of 1,2,3,4-cyclopentanetetracarboxylic acid prepared in accordance with Example I is added to an iced solution of sodium hydroxide and the bromine is added to the ice-cold mixture with stirring. The resulting precipitate is filtered immediately to give the N,N'-dibromodiimide derivative of 1,2,3,4-cyclopentanetetracarboxylic acid.

The N,N'-dichloro derivative may be prepared in an analogous manner by substituting chlorine for the bromine.

Example VII

This example illustrates the preparation of the unsubstituted monoimide of the monoanhydride of 1,2,3,4-cyclopentanetetracarboxylic acid.

To a 250 milliliter three-necked flask is added 35.7 grams of the monoanhydride of cis,cis,cis,cis-1,2,3,4-cyclopentanetetracarboxylic acid and 10.5 cc. of 28% aqueous ammonium hydroxide. The temperature increases rapidly to 100° C. and the flask is fitted with a thermometer and an air condenser.

After heating for 2 hours until the melt temperature is 300° C., the hot melt is cooled to thereby obtain the unsubstituted monoimide of the monoanhydride of cis,cis,cis,cis - 1,2,3,4 - cyclopentanetetracarboxylic acid. The monoimide-monoanhydride is obtained rather than the monoimide-diacid due to thermal dehydration upon heating the reaction mixture to a melt temperature of 300° C.

Example VIII

This example illustrates the preparation of the unsubstituted monoimide of the monoanhydride of 1,2,3,4-cyclopentanetetracarboxylic acid.

A thin layer of finely divided dianhydride of cis,cis,cis,cis-1,2,3,4-cyclopentanetetracarboxylic acid is deposited in a vessel closed to the ambient atmosphere. Then, the dianhydride is reacted with a controlled amount of anhydrous gaseous ammonia in a dry nitrogen atmosphere at substantially normal ambient temperature. Under these conditions, one mole of the ammonia is reacted with each mole of the dianhydride to form the monoanhydride-monoamide-monoacid derivative of cis,cis,cis,cis-1,2,3,4-cyclopentanetetracarboxylic acid. The resulting reaction product is heated at a temperature of 200–300° C. to produce the monoimide of the monoanhydride of cis,cis,cis,cis-1,2,3,4-cyclopentanetetracarboxylic acid.

If desired, it is also possible to follow the above procedure to prepare diimides of amines volatile under the reaction conditions by substituting the amine for ammonia.

Example IX

This example illustrates the preparation of the monoimide derivative of 1,2,3,4-cyclopentanetetracarboxylic acid.

A sample of finely divided monoanhydride of cis,cis,cis,cis-1,2,3,4-cyclopentanetetracarboxylic acid is deposited as a thin layer in a dry vessel closed to the ambient atmosphere. Then, the monoanhydride is reacted at substantially ambient temperature with gaseous anhydrous ammonia in a dry, nitrogen atmosphere to produce a monoamide-triacid derivative. The resulting monoamide-triacid derivative is thermally treated at 100–200° C. to convert it to the monoimide of cis,cis,cis,cis-1,2,3,4-cyclopentanetetracarboxylic acid.

The above procedure also may be followed to prepare substituted monoimides by using amines volatile under the reaction conditions rather than the anhydrous ammonia.

Example X

This example illustrates the preparation of the monoimide of 1,2,3,4-cyclopentanetetracarboxylic acid.

A suspension of the dianhydride of cis,cis,cis,cis-1,2,3,4-cyclopentanetetracarboxylic acid in glacial acetic acid as a solvent is treated with an equimolar amount of ammonia. Thereafter the glacial acetic acid solvent is removed and the residue is treated at a temperature of 100–300° C. to produce the monoimide-monoanhydride derivative. The resulting monoimide-monoanhydride derivative is hydrolyzed under mild conditions with aqueous sodium hydroxide to produce the monoimide-diacid-disalt, which after neutralization with dilute sulfuric acid yields the monoimide of cis,cis,cis,cis-1,2,3,4-cyclopentanetetracarboxylic acid. If desired, the hydrolysis may be accomplished by gentle heating in water alone or in the presence of a catalytic amount of a tertiary amine such as pyridine.

Example XI

This example illustrates the preparation of the diimide of 1,2,3,4-cyclopentanetetracarboxylic acid.

The dianhydride of 1,2,3,4-cyclopentanetetracarboxylic acid was mixed with an excess of ammonium acetate over the quantity required to produce the diimide derivative and the mixture was heated. The ammonium acetate melted and the dianhydride dissolved therein to yield a clear solution at about 75–100° C. Continued heating to a higher temperature caused decomposition of the ammonium acetate to produce ammonia and acetic acid, with accompanying reaction of the ammonia with the dianhydride and volatilization of the acetic acid. Further heating to 150–200° C. yielded a cloudy solution which became clear as the temperature reached 250–300° C. The clear melt was poured into water and broken up to produce the unsubstituted diimide of 1,2,3,4-cyclopentanetetracarboxylic acid. The diimide product was snow white in color and substantially pure as produced and a recrystallization was not necessary.

What is claimed is:

1. The unsubstituted monoimide of 1,2,3,4-cyclopentanetetracarboxylic acid.

2. The unsubstituted monoimide of the monoanhydride of 1,2,3,4-cyclopentanetetracarboxylic acid.

3. A substance selected from the group consisting of the unsubstituted monoimide of 1,2,3,4-cyclopentanetetracarboxylic acid, the unsubstituted monoimide of the monoanhydride of 1,2,3,4-cyclopentanetetracarboxylic acid, the N-alkyl, N-haloalkyl, N-cycloalkyl, N-monocarbocylic aryl, N-halo and N-metal monoimides of 1,2,3,4-cyclopentanetetracarboxylic acid, the N-alkyl, N-haloalkyl, N-cycloalkyl, N-monocarbocyclic aryl, N-halo and N-metal monoimides of the monoanhydride of 1,2,3,4-cyclopentanetetracarboxylic acid, the unsubstituted diimide of 1,2,3,4-cyclopentanetetracarboxylic acid and the N,N'-dialkyl, N,N'-dihaloalkyl, N,N'-dicycloalkyl, N,N'-dimonocarbocyclic aryl, N-alkyl, N'-monocarbocyclic aryl, N,N'-dihalo and N,N'-dimetal diimides of 1,2,3,4-cyclopentanetetracarboxylic acid, wherein the foregoing alkyl groups, haloalkyl groups and cycloalkyl groups have 1 through 20 carbon atoms and the monocarbocyclic aryl groups have 6 through 20 carbon atoms.

4. The unsubstituted diimide of 1,2,3,4-cyclopentanetetracarboxylic acid.

5. The unsubstituted diimide of cis,cis,cis,cis-1,2,3,4-cyclopentanetetracarboxylic acid.

6. The N,N'-dihalo diimide of 1,2,3,4-cyclopentanetetracarboxylic acid.

7. The N,N'-dichloro diimide of 1,2,3,4-cyclopentanetetracarboxylic acid.

8. The N,N'-dibromo diimide of 1,2,3,4-cyclopentanetetracarboxylic acid.

9. The N,N'-dialkyl diimide of 1,2,3,4-cyclopentanetetracarboxylic acid, the alkyl groups each having 1 through 20 carbon atoms.

10. The N,N'-dibutyl diimide of 1,2,3,4-cyclopentanetetracarboxylic acid.

11. The N,N'-diaryl diimide of 1,2,3,4-cyclopentanetetracarboxylic acid, the monocarbocylic aryl groups each having 6 through 20 carbon atoms.

12. The N,N'-diphenyl diimide of 1,2,3,4-cyclopentanetetracarboxylic acid.

13. The N,N'-diphenyl diimide of cis,cis,cis,cis-1,2,3,4-cyclopentanetetracarboxylic acid.

14. The N,N'-dialkali metal diimide of 1,2,3,4-cyclopentanetetracarboxylic acid.

15. The N,N'-disodium diimide of 1,2,3,4-cyclopentanetetracarboxylic acid.

16. The N,N'dipotassium diimide of 1,2,3,4-cyclopentanetetracarboxylic acid.

17. A substance in accordance with claim 3 wherein the 1,2,3,4-cyclopentanetetracarboxylic acid is cis,cis,cis,cis-1,2,3,4-cyclopentanetetracarboxylic acid.

References Cited by the Examiner

Alder et al.: Ann. vol. 211, page 7 (1958).
Longone: J. Org. Chem. vol. 28, 1770–3 (1963).

ALEX MAZEL, *Primary Examiner.*

HENRY R. JILES, *Examiner.*

JOSE TOVAR, *Assistant Examiner.*